United States Patent
Nakagawa

(10) Patent No.: US 8,053,505 B2
(45) Date of Patent: Nov. 8, 2011

(54) FIRE RETARDANT MATERIAL AND MOLDED BODY

(75) Inventor: Hiroyuki Nakagawa, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 141 days.

(21) Appl. No.: 12/588,566

(22) Filed: Oct. 20, 2009

(65) Prior Publication Data

US 2010/0113672 A1  May 6, 2010

(30) Foreign Application Priority Data

Oct. 31, 2008 (JP) ................................ 2008-282229

(51) Int. Cl.
*C08K 3/26* (2006.01)
*C08K 3/34* (2006.01)

(52) U.S. Cl. ........ 524/427; 524/425; 524/449; 524/451; 524/456

(58) Field of Classification Search .................. 524/425, 524/449, 451, 456, 427
See application file for complete search history.

(56) References Cited

U.S. PATENT DOCUMENTS

| 5,464,907 A | * | 11/1995 | Jelenic et al. | ................ | 525/303 |
| 6,426,388 B1 | * | 7/2002 | Fujino et al. | ................ | 525/285 |

FOREIGN PATENT DOCUMENTS

| JP | A-08-3362 | 1/1996 |
| JP | A-10-45967 | 2/1998 |
| JP | A-10-330556 | 12/1998 |
| JP | A-11-349779 | 12/1999 |

* cited by examiner

*Primary Examiner* — Peter Szekely
(74) *Attorney, Agent, or Firm* — Posz Law Group, PLC

(57) ABSTRACT

An object is to provide a fire retardant material capable of being molded by an injection molding machine and free from deterioration of the physical properties and a molded body formed of the fire retardant material. A fire retardant includes a degraded polypropylene resin obtained by melt kneading a polypropylene resin and an organic peroxide, wherein a weight average molecular weight of the degraded polypropylene is from 50,000 to 200,000; and an inorganic filler, wherein a mass ratio of the polypropylene to the inorganic filler is from 95/5 to 10/90.

9 Claims, 1 Drawing Sheet

FIRE RETARDANT MATERIAL AND MOLDED BODY

CROSS REFERENCE TO THE RELATED APPLICATIONS

This application claims priority from Japanese Patent Application No. 2008-282229 filed on Oct. 31, 2008, and entire subject matter of which are incorporated herein by reference.

TECHNICAL FIELD

The present invention relates to a polypropylene resin-containing fire retardant material and a molded body molded from the fire retardant material.

BRIEF DESCRIPTION OF RELATED ARTS

As regards the method for imparting fire retardancy to a resin material which is molded by an injection molding machine or the like, a method of compounding a fire retarder such as halogen compound, phosphorus compound or metal hydroxide to the resin material has been employed. However, when a highly combustible resin such as polypropylene resin is made to be fire retardant by this method, the resin material needs to contain from 20 to 60 mass % of a fire retarder. For example; in JP-A-10-330556, the resin material contains from 20 to 45 mass % of a metal hydroxide. Accordingly, such a resin material has a problem that not only the physical properties are deteriorated but also the price of which is high.

Incidentally, although not a fire retardant material, JP-A-10-45967 describes a material where from 36 to 72 parts by weight of an inorganic filler such as calcium carbonate is compounded to a resin that is composed of 100 parts by weight of a polypropylene-based resin and from 1 to 16 parts by weight of a polyethylene-based resin and reduced in the molecular weight by an organic peroxide; JP-A-8-3362 describes a material where the molecular weight of a polypropylene resin is reduced using a masterbatch prepared by incorporating an organic peroxide into talc; and JP-A-11-349779 describes a material composed of 80 mass % of a polypropylene resin having a weight average molecular weight of 120,000 and 20 mass % of talc. As for the material of JP-A-8-3362, it is unknown whether the resin material is combustible or not because the compounding amount of a polypropylene resin is not specifically described, whereas the materials of JP-A-10-45967 and JP-A-11-349779 are combustible (see, Comparative Examples 6 to 10 of Table 2).

SUMMARY

An object of the present invention is to provide a fire retardant material capable of being molded by an injection molding machine and free from deterioration of the physical properties and a molded body formed of the fire retardant material.

For attaining the above-described object, it is required to suppress the combustion/oxidation reaction of a resin (e.g. polypropylene resin or the like), which occurs continuously during combustion. That is, it is necessary to break the combustion cycle of the resin, so that a material containing a combustible resin such as polypropylene resin can be resistant to flame.

Here, the combustion cycle of a resin (e.g. polypropylene resin or the like) is described. The combustion cycle is a cycle of the following processes (a) to (e). In the process (a), combustion occurs by catching fire. In the process (b), the combustion heat (oxidation heat) generated by the combustion is radiated and transferred. Thus a resin in the periphery of the combusting resin is melted. In the process (c), the melted resin is further heated by the combustion heat to produce a thermal degradation product. In the process (d), the thermal degradation product is gasified and diffuses. In the process (e), out of the gasified and diffused thermal degradation products, a combustible gas catches fire due to the combustion heat.

For breaking this combustion cycle, two measures are taken in combination to achieve flame retardation. The first one is a measure for suppressing the combustion/oxidation reaction of a combustible gas and the second one is a measure for decreasing the temperature of a combustion site where the combustion/oxidation reaction of the resin is going on. More specifically, the first measure is to compound an inorganic filler so as to suppress the diffusion and generation of a combustion gas. The second measure is to reduce the molecular weight of the resin by the melt kneading with an organic peroxide and thereby allow for easy melting so as to decrease the temperature by the latent heat involved in the phase transition from a solid phase to a liquid phase and reduce the heat associated with the combustion. Also, by compounding an inorganic filler, the adiabatic effect of the inorganic filler is utilized.

Accordingly, the fire retardant material of the first aspect of the present invention comprises a degraded polypropylene resin reduced in the molecular weight by melt kneading a polypropylene resin together with an organic peroxide and thereby degrading the polypropylene resin, and an inorganic filler, wherein the weight average molecular weight of the degraded polypropylene resin is from 50,000 to 200,000 and the compounding ratio between the polypropylene resin and the inorganic filler is from 95/5 to 10/90 in terms of the mass ratio (polypropylene resin/inorganic filler).

Accordingly, the molded body of the present invention is obtained by molding the above-described fire retardant material.

The embodiment of each component in the present invention is described below by way of example.

1. Degraded Polypropylene Resin

When the degraded polypropylene resin has a weight average molecular weight (Mw) of 50,000 to 200,000, molding can be successfully performed. At the same time, fire retardancy can be imparted. If the weight average molecular weight is less than 50,000, not only molding becomes difficult but also the molded body may be cracked at the removal from the mold. Whereas the weight average molecular weight exceeds 200,000, fire retardancy is lost. The weight average molecular weight is preferably from 90,000 to 200,000, more preferably from 90,000 to 150,000.

The mechanism that a material is made fire retardant by using the degraded polypropylene is owed to the following three actions. That is, 1) in the degraded polypropylene resin, the molecular chain of the polypropylene molecule is randomly broken by the degradation action of the organic peroxide, as a result, the molecular weight distribution becomes broader than that of the polypropylene resin having the same average molecular weight produced by polymerization. Therefore, the degraded polypropylene resin contains many molecules having a small molecular weight (small degree of polymerization), and in turn, the heat at the combustion becomes smaller than that of the polypropylene resin having the same average molecular weight produced by polymerization. Also, 2) the degraded polypropylene resin contains ketones, carbonyls, alcohols and oxides such as carbon dioxide, which are produced as a by-product by the degradation action of the organic peroxide. Such oxides inhibit oxidation reaction by combustion of the polypropylene molecule. Furthermore, 3) the degraded polypropylene resin contains an oxide such as unreacted organic peroxide which is capable of producing a radical under heating. When a radical is produced due to heat at the combustion, reduction in the molecule of the polypropylene molecule is accelerated.

2. Polypropylene Resin

The polypropylene resin is not particularly limited, but examples thereof include a homopolypropylene, a random polypropylene and a block polypropylene.

The weight average molecular weight is not particularly limited but is preferably from 200,000 to 600,000.

3. Inorganic Filer

The inorganic filler is not particularly limited, but examples thereof include calcium carbonate, talc, wollastonite, mica, clay and silica. Of these, for example, calcium carbonate, talc, wollastonite and mica are preferred, because the physical properties such as rigidity are enhanced by compounding thereof.

The size of the inorganic filler is not particularly limited but is preferably from 1 to 500 μm in terms of the average particle diameter, because processing such as kneading is easy and a molded body having a good surface state is obtained.

4. Organic Peroxide

The organic peroxide is not particularly limited but includes those capable of degrading a polypropylene resin to reduce its molecular weight. Specific examples are benzoyl peroxide, 1,1-bis(tert-butylperoxy)-3,3,5-trimethylcyclohexane, n-butyl 4,4'-bis(tert-butylperoxy)valerate, dicumyl peroxide, tert-butyl peroxybenzoate, di-tert-butyl peroxide, α,α'-bis(tert-butylperoxy)diisopropylbenzene, 2,5-dimethyl-2,5-bis(tert-butylperoxy)hexane, 2,5-dimethyl-2,5-bis(tert-butylperoxy)hexyne-3 and tert-butylperoxycumene.

The compound proportion of the organic peroxide is not particularly limited but is preferably from 0.2 to 2 parts by weight, more preferably from 0.4 to 1.2 parts by weight, per 100 parts by weight of the total amount of the polypropylene resin and the inorganic filler. The compounded proportion of the organic peroxide is specified by a ratio to the total amount of the polypropylene resin and the inorganic filler, because the inorganic filler acts as an inhibitory factor for the degradation reaction of the polypropylene resin by the organic peroxide. When degradation of the polypropylene resin by the organic peroxide is preformed in the presence of the inorganic filler, the molecular weight of the degraded polypropylene resin is changed according to the compounding amount of the inorganic filler. Also, the organic peroxide may be diluted with the inorganic filler such as talc and clay, rubber or the like.

5. Compounding Ratio

When the compounding ratio between the polypropylene resin and the inorganic filler is from 95/5 to 10/90 in terms of the mass ratio (polypropylene resin/inorganic filler), molding can be successfully performed and fire retardancy can be ensured. If the ratio of the inorganic filler is less than 95/5, the fire retardancy is lost, whereas if the ratio of the inorganic filler is more than 10/90, molding cannot be successfully performed. The compounding ratio is preferably from 90/10 to 20/80.

6. Melt Kneading

The method for melt kneading a polypropylene resin together with an organic peroxide is not particularly limited and may be a batch system using a Banbury mixer, a pressure kneader or the like or may be a continuous system using a twin-screw extruder. Also, the temperature when heating the inside of a tank at the melt kneading is not particularly limited but is preferably from 200 to 240° C. The melt kneading simultaneously performs kneading of the degraded polypropylene resin and the inorganic filler. In other words, the polypropylene resin, the organic peroxide and the inorganic filler may be charged into a kneader and melt kneaded, or the propylene resin and the organic peroxide except for the inorganic filler may be charged into a kneader and melt kneaded.

7. Other Compounding Ingredients

Other compounding ingredients such as colorant, antioxidant, plasticizer, fire retarder, optical stabilizer, lubricant, antistatic agent, organic fiber, filler, reinforcement and core agent may be compounded within the range not impairing the objects of the present invention.

8. Molding

The method for molding a molded body is not particularly limited, but examples thereof include the methods used for molding of a resin material, such as injection molding, press molding, extrusion molding and blow molding.

9. Usage

The usage of the molded body is not particularly limited, but examples thereof include interior automotive parts such as console box and instrument panel, and a battery case of electronic devices. Also, the molded body may be used as a surface layer of a resin product by two-color molding or the like for giving a fire retardant surface to the resin product or may be used as a core layer of a resin product for reducing the combustion heat quantity of the resin product.

According to the present invention, a fire retardant material capable of being molded by an injection molding machine and free from reduction in the physical properties and a molded body formed of the fire retardant material can be provided.

DETAIL DESCRIPTION OF THE EXEMPLARY EMBODIMENTS OF THE PRESENT INVENTION

Figure 1:
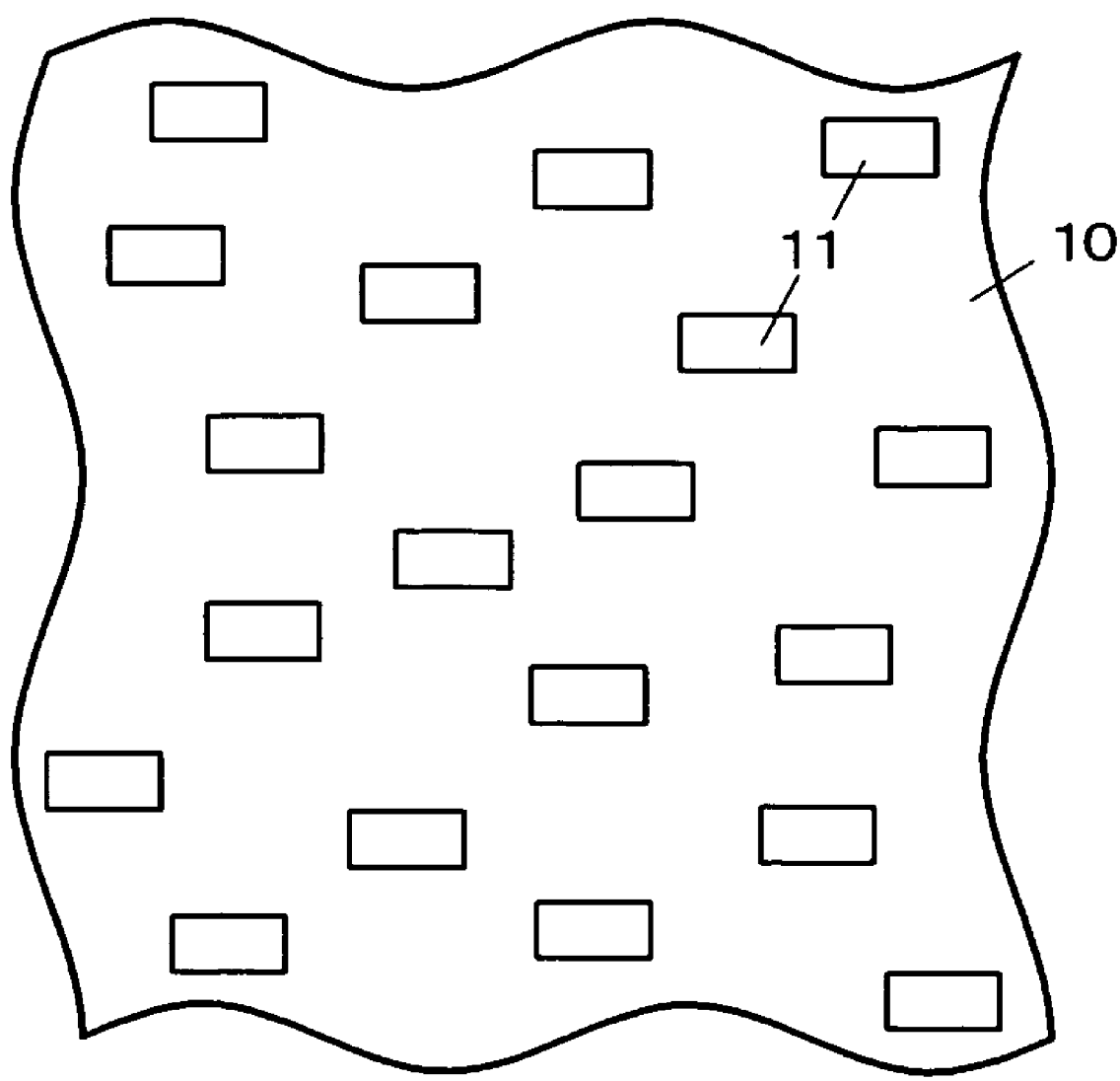
FIG. 1 is a schematic view of the fire retardant material of the present invention.

A fire retardant material including a degraded polypropylene resin reduced in the molecular weight by melt kneading a polypropylene resin together with an organic peroxide, and an inorganic filler that is calcium carbonate, talc, wollastonite or mica, wherein the weight average molecular weight of the degraded polypropylene resin is from 90,000 to 150,000 and the mass ratio between the polypropylene resin and the inorganic filler is from 90/10 to 20/80 in terms of the mass ratio (polypropylene resin/inorganic filler), is molded by injection molding to form a molded body.

EXAMPLES

In the fire retardant material of the present invention, as shown in FIG. 1, a degraded polypropylene resin 10 and an inorganic filler 11 are kneaded.

As Examples of the present invention, 10 kinds of fire retardant materials were prepared by changing the composition and measured or evaluated for the combustion rate, the weight average molecular weight of degraded polypropylene resin, the surface appearance of molded body and the injection moldability. The results of these measurements and evaluations for the Examples are shown in Table 1. Incidentally, as Comparative Examples, 10 kinds of fire retardant materials were prepared by changing the composition and similarly to Examples, measured or evaluated for the combustion rate, the weight average molecular weight of degraded polypropylene resin, the surface appearance of molded body and the injection moldability. The results of these measurements and evaluations for the Comparative Examples are shown in Table 2.

TABLE 1

| | | | Example 1 | Example 2 | Example 3 | Example 4 | Example 5 |
|---|---|---|---|---|---|---|---|
| Formulation (parts by weight) | PP Resin 2 (Mw: 450,000) | | 90 | 80 | 60 | 40 | 20 |
| | Inorganic Filler | Calcium carbonate (average particle diameter: 7.4 μm) | 10 | 20 | 40 | 60 | 80 |
| | | Talc 1 (average particle diameter: 6.0 μm) | | | | | |
| | | Wollastonite (average particle diameter: 15 μm) | | | | | |
| | | Mica (average particle diameter: 180 μm) | | | | | |
| | Total amount of PP resin and inorganic filler | | 100 | 100 | 100 | 100 | 100 |
| | Organic peroxide (amount of active ingredient) | | 2 (0.8) | 2 (0.8) | 2 (0.8) | 2 (0.8) | 2 (0.8) |
| Physical properties of material | Combustion rate (mm/min) | | 0 | 0 | 0 | 0 | 0 |
| | Weight average molecular weight of degraded PP resin (Mw) | | 140,000 | 140,000 | 140,000 | 140,000 | 140,000 |
| | Surface appearance of molded body | | A | A | A | A | A |
| | Injection moldability | | A | A | A | A | A |
| | | | Example 6 | Example 7 | Example 8 | Example 9 | Example 10 |
| Formulation (parts by weight) | PP Resin 2 (Mw: 450,000) | | 80 | 80 | 80 | 80 | 80 |
| | Inorganic Filler | Calcium carbonate (average particle diameter: 7.4 μm) | | | | 20 | 20 |
| | | Talc 1 (average particle diameter: 6.0 μm) | 20 | | | | |
| | | Wollastonite (average particle diameter: 15 μm) | | 20 | | | |
| | | Mica (average particle diameter: 180 μm) | | | 20 | | |
| | Total amount of PP resin and inorganic filler | | 100 | 100 | 100 | 100 | 100 |
| | Organic peroxide (amount of active ingredient) | | 2 (0.8) | 2 (0.8) | 2 (0.8) | 1 (0.4) | 3 (1.2) |
| Physical properties of material | Combustion rate (mm/min) | | 0 | 0 | 0 | 0 | 0 |
| | Weight average molecular weight of degraded PP resin (Mw) | | 140,000 | 140,000 | 140,000 | 190,000 | 100,000 |
| | Surface appearance of molded body | | A | A | A | A | A |
| | Injection moldability | | A | A | A | A | A |

TABLE 2

| | | | Comparative Example 1 | Comparative Example 2 | Comparative Example 3 | Comparative Example 4 | Comparative Example 5 |
|---|---|---|---|---|---|---|---|
| Formulation (parts by weight) | PP Resin 1 (Mw: 7,000) | | 90 | | | | |
| | PP Resin 2 (Mw: 450,000) | | | 80 | 100 | 100 | 5 |
| | PP Resin 3 (Mw: 130,000) | | | | | | |
| | High-density PE resin | | | | | | |
| | EPDM | | | | | | |
| | Inorganic filler | Calcium carbonate (average particle diameter: 7.4 μm) | 10 | | | | 95 |
| | | Talc 1 (average particle diameter: 6.0 μm) | | 20 | | | |
| | | Wollastonite (average particle diameter: 15 μm) | | | | | |
| | | Mica (average particle diameter: 180 μm) | | | | | |
| | | Talc 2 (average particle diameter: 2.7 μm) | | | | | |
| | | Fibrous magnesium oxysulfate | | | | | |
| | Total amount of PP resin and inorganic filler | | 100 | 100 | 100 | 100 | 100 |
| | Organic peroxide (amount of active ingredient) | | | | | 2 (0.8) | 0.2 (0.08) |
| Physical properties of material | Combustion rate (mm/min) | | — | 50 | 50 | 49 | — |
| | Weight average molecular weight of degraded PP resin (Mw) | | — | — | — | 140,000 | — |
| | Surface appearance of molded body | | — | A | A | A | B |
| | Injection moldability | | B | A | A | A | B |

TABLE 2-continued

|  |  | Comparative Example 6 | Comparative Example 7 | Comparative Example 8 | Comparative Example 9 | Comparative Example 10 |
|---|---|---|---|---|---|---|
| Formulation (parts by weight) | PP Resin 1 (Mw: 7,000) |  |  |  |  |  |
|  | PP Resin 2 (Mw: 450,000) |  |  | 75 | 75 | 75 |
|  | PP Resin 3 (Mw: 130,000) | 80 | 80 |  |  |  |
|  | High-density PE resin |  |  | 5 |  |  |
|  | EPDM |  |  |  | 5 | 5 |
|  | Inorganic filler — Calcium carbonate (average particle diameter: 7.4 μm) |  |  | 12.5 | 12.5 | 12.5 |
|  | Talc 1 (average particle diameter: 6.0 μm) |  | 20 |  |  |  |
|  | Wollastonite (average particle diameter: 15 μm) |  |  |  |  |  |
|  | Mica (average particle diameter: 180 μm) |  |  |  |  |  |
|  | Talc 2 (average particle diameter: 2.7 μm) | 20 |  |  |  |  |
|  | Fibrous magnesium oxysulfate |  |  | 12.5 | 12.5 | 12.5 |
|  | Total amount of PP resin and inorganic filler | 100 | 100 | 100 | 100 | 100 |
|  | Organic peroxide (amount of active ingredient) |  |  | 1.7 (0.68) | 1.7 (0.68) |  |
| Physical properties of material | Combustion rate (mm/min) | 57 | 57 | 53 | 47 | 67 |
|  | Weight average molecular weight of degraded PP resin (Mw) | — | — | 170,000* | 170,000* | — |
|  | Surface appearance of molded body | A | A | A | A | A |
|  | Injection moldability | A | A | A | A | A |

Each sample was prepared as follows.

In Example 1, the sample was prepared by mixing, as shown in the formulation of Table 1, 90 parts by weight of PP resin 2 that is a block polypropylene having a weight average molecular weight (Mw) of 450,000, 10 parts by weight of calcium carbonate having an average particle diameter of 7.4 μm, and 2 parts by weight of an organic peroxide diluted such that the content of dicumyl peroxide as an active ingredient becomes 40 mass %, and melt kneading the mixture using a twin-screw extruder at a preset temperature of 230° C.

In Example 2, the sample was prepared by the same composition as in Example 1 in the same manner as in Example 1 except for, as shown in the formulation of Table 1, changing the amount of PP resin 2 to 80 parts by weight and changing the amount of calcium carbonate to 20 parts by weight.

In Examples 3, 4 and 5, the samples were also prepared by the same composition as in Example 1 in the same manner as in Example 1 except for changing the compounding amounts of PP resin 2 and calcium carbonate as shown in the formulation of Table 1.

In Examples 6, 7 and 8, the samples were prepared by the same composition as in Example 2 in the same manner as in Example 1 except for, as shown in the formulation of Table 1, changing calcium carbonate to talc 1 having an average particle diameter of 6.0 μm, wollastonite having an average particle diameter of 15 μm, or mica having an average particle diameter of 180 μm.

In Examples 9 and 10, the samples were prepared by the same composition as in Example 2 in the same manner as in Example 1 except for, as shown in the formulation of Table 1, changing the compounding amount of organic peroxide to 1 part by weight or 3 parts by weight.

In Comparative Example 1, the sample was prepared in the same manner as in Example 1 by mixing, as shown in the formulation of Table 2, 90 parts by weight of PP resin 1 that is a polypropylene having a weight average molecular weight (Mw) of 7,000, and 10 parts by weight of calcium carbonate.

In Comparative Example 2, the sample was prepared in the same manner as in Example 1 by mixing, as shown in the formulation of Table 2, 80 parts by weight of PP resin 2 and 20 parts by weight of talc 1.

In Comparative Sample 3, as shown in the formulation of Table 2, the sample was PP resin 2 itself.

In Comparative Example 4, the sample was prepared in the same manner as in Example 1 by mixing, as shown in the formulation of Table 2, 100 parts by weight of PP resin 2 and 2 parts by weight of organic peroxide.

In Comparative Example 5, the sample was prepared in the same manner as in Example 1 by mixing, as shown in the formulation of Table 2, 5 parts by weight of PP resin 2, 95 parts by weight of calcium carbonate and 0.2 parts by weight of organic peroxide.

In Comparative Examples 6 and 7, the samples were prepared in the same manner as in Example 1 by mixing, as shown in the formulation of Table 2, 80 parts by weight of PP resin 3 that is a polypropylene having a weight average molecular weight (Mw) or 130,000, and 20 parts by weight of talc 1 or talc 2 having a particle diameter of 2.7 μm.

In Comparative Examples 8 and 9, the samples were prepared in the same manner as in Example 1 by mixing, as shown in the formulation of Table 2, 75 parts by weight of PP resin 2, 5 parts by weight of high-density PE resin (high-density polyethylene resin) having a melt flow rate (MFR) of 1 g/10 min or EPDM (ethylene-propylene-diene copolymer), 12.5 parts by weight of calcium carbonate, 12.5 parts by weight of fibrous magnesium oxysulfate, and 1.7 parts by weight of organic peroxide.

In Comparative Example 10, the sample was prepared in the same manner as in Example 1 by excluding the organic peroxide from Comparative Example 9 as shown in the formulation of Table 2.

Measurements or evaluations of Examples of the present invention and Comparative Examples were performed as follows.

(1) Combustion Rate

The combustion rate was measured in accordance with MVSS Combustion Test of JIS D1201.

The specimen for measurement was molded using a 80-t injection molding machine under the molding conditions of a cylinder preset temperature of 230° C. and a mold temperature of 40° C.

(2) Weight Average Molecular Weight of Degraded PP Resin

In the measurement of the weight average molecular weight of degraded PP resin (degraded polypropylene resin), a value in terms of polystyrene was determined using a high-temperature GPC system (manufactured by Nihon Waters K.K.). However, as for Comparative Examples 8 and 9, the degraded PP resin and the degraded high-density PE resin or EPDM were integrated together and could not be separated. Therefore, since the weight average molecular weight of each resin could not be individually measured, that of a mixture of degraded PP resin and degraded high-density PE resin or EPDM was measured.

(3) Surface Appearance of Molded Body

A molded plate (thickness: 2 mm) in 70 mm square was molded using a 80-t injection molding machine under the same molding conditions as in the preparation of a specimen for measurement of combustion rate above, and its surface state was evaluated by an sensory rating with eyes.

Good surface appearance was rated A, and bad surface appearance was rated B.

(4) Injection Moldability

Moldability at the injection molding as above was evaluated.

The injection moldability was rated A when molding could be performed without a problem in terms of residence stability, flowability and the like, and rated B when a problem such as lack of flowability or measurement failure was caused at the molding.

As seen from the results above, in all Examples, the combustion rate is 0 mm/min, revealing flame retardancy. Also, a molded body can be molded by injection molding without a problem and at the same time, the appearance of the molded body is good. Furthermore, since an inorganic filler is compounded, the physical properties such as rigidity are more enhanced than the polypropylene resin. Incidentally, as for Examples 1 to 8, even when the ratio of the organic peroxide to the polypropylene resin is changed due to a change in the compounding amount of the polypropylene resin, the value of the weight average molecular weight of the degraded propylene resin is not changed, and this occurs because a polypropylene resin, an inorganic filler and an organic peroxide are melt kneaded together and the inorganic filler acts as an inhibitory factor for the degradation reaction of the polypropylene by the organic peroxide. In this regard, the present inventors presume that even when the ratio of the organic peroxide to the polypropylene is changed, since the compounding amount of the inorganic filler is also changed, the effect by the change in the compounding amount of the inorganic filler offsets the effect by the change in the ratio of the organic peroxide to the polypropylene resin.

On the other hand, in Comparative Example 1 where the sample is composed of a polypropylene resin having a low molecular weight (7,000) and calcium carbonate, a molded body cannot be molded by injection molding.

In Comparative Examples 2 and 3 where an organic peroxide is not compounded and therefore, the polypropylene resin used in Example is not turned into a degraded polypropylene resin, the sample is burned irrespective of compounding or no compounding of an inorganic filler and fails in exhibiting flame retardancy.

In Comparative Example 4 where a polypropylene resin is turned into a degraded polypropylene resin having a weight average molecular weight of 140,000 by the melt kneading with an organic peroxide, since an organic filler is not compounded, the sample is burned and fails in exhibiting flame retardancy.

In Comparative Example 5 where an inorganic filler is compounded in a large amount (95 parts by weight), a problem arises at the injection molding and, at the same time, the appearance of the molded body is not good.

In Comparative Examples 6 and 7 where the weight average molecular weight is 130,000 but the resin is not a degraded polypropylene resin, the sample is burned and fails in exhibiting flame retardancy.

In Comparative Examples 8 and 9, a polypropylene resin is turned into a degraded polypropylene resin having a weight average molecular weight of 170,000 by the melt kneading with an organic peroxide, nevertheless, since a degradation product of high-density PE resin or EPDM that are more combustible than polypropylene is contained, the sample is burned and fails in exhibiting flame retardancy.

In Comparative Example 10 where EPDM that is more combustible than polypropylene is compounded, the sample is burned and fails in exhibiting flame retardancy.

The present invention is not limited to these Examples and can be embodied by making appropriate changes or modifications within the scope not departing from the purport of the present invention.

The invention claimed is:

1. A fire retardant comprising:
   a degraded polypropylene resin obtained by melt kneading a polypropylene resin and an organic peroxide under a temperature from 200° C. to 240° C., wherein a weight average molecular weight of the degraded polypropylene resin is from 90,000 to 200,000; and
   an inorganic filler, wherein a mass ratio of the polypropylene resin to the inorganic filler is from 95/5 to 10/90.

2. The fire retardant according to claim 1, wherein the inorganic filler is at least one member selected from the group consisting of calcium carbonate, talc, wollastonite, and mica.

3. A molded body which is molded from the fire retardant according to claim 1.

4. A molded body which is molded from the fire retardant according to claim 2.

5. The fire retardant according to claim 1, wherein the compound proportion of the organic peroxide is from 0.2 to 2 parts by weight against the total amount of the polypropylene resin and the inorganic filler of 100 parts by weight.

6. The fire retardant according to claim 1, wherein the polypropylene resin, the organic peroxide, and the inorganic filler are melt kneaded under a temperature from 200 degree Celsius to 240 degree Celsius.

7. A fire retardant comprising:
   a degraded polypropylene resin obtained by melt kneading a polypropylene resin and an organic peroxide under a temperature from 200° C. to 240° C., wherein a weight average molecular weight of the degraded polypropylene resin is from 90,000 to 200,000; and
   an inorganic filler, wherein a composition range is from 95 parts by weight of the polypropylene resin and 5 parts by weight of the inorganic filler to 10 parts by weight of the polypropylene resin and 90 parts by weight of the inorganic filler against 100 parts by weight of the polypropylene resin and the inorganic filler.

8. The fire retardant according to claim 1, wherein the molecular weight of the degraded polypropylene resin is reduced by about 22 to about 31% relative to a molecular weight of a corresponding starting polypropylene resin prior to the melt kneading.

9. The fire retardant according to claim 7, wherein the molecular weight of the degraded polypropylene resin is reduced by about 22 to about 31% relative to a molecular weight of a corresponding starting polypropylene resin prior to the melt kneading.

* * * * *